United States Patent [19]
Bartlett

[11] Patent Number: 4,979,482
[45] Date of Patent: Dec. 25, 1990

[54] FUEL RESERVOIR

[75] Inventor: Peter J. Bartlett, Kent, England

[73] Assignee: Lucas Industries Public Limited Company, Birmingham, England

[21] Appl. No.: 246,291

[22] Filed: Sep. 16, 1988

[51] Int. Cl.$^5$ .............................................. F02M 39/00
[52] U.S. Cl. ................................... 123/510; 123/514; 123/509
[58] Field of Search ............... 123/514, 516, 510, 511, 123/509

[56] References Cited

U.S. PATENT DOCUMENTS

| | | | |
|---|---|---|---|
| 3,973,536 | 8/1976 | Zelders | 123/541 |
| 4,175,527 | 11/1979 | Sanada | 123/516 |
| 4,296,723 | 10/1981 | Aldrich | 123/510 |
| 4,501,251 | 2/1985 | Kelch | 123/509 |
| 4,539,965 | 9/1985 | Soltau | 123/514 |
| 4,582,039 | 4/1986 | Nishida | 123/514 |
| 4,595,030 | 6/1986 | Yazaki | 123/590 |
| 4,763,633 | 8/1988 | Nakanishi | 123/509 |
| 4,795,556 | 1/1989 | Brotea | 123/510 |
| 4,814,087 | 3/1989 | Taylor | 123/510 |

FOREIGN PATENT DOCUMENTS

| | | | |
|---|---|---|---|
| 2460101 | 6/1976 | Fed. Rep. of Germany | 123/514 |
| 58-77158 | 5/1983 | Japan | 123/510 |
| 1181059 | 2/1970 | United Kingdom . | |
| 1358073 | 6/1974 | United Kingdom . | |
| 2160833 | 1/1986 | United Kingdom . | |

Primary Examiner—Carl Stuart Miller
Attorney, Agent, or Firm—Dvorak and Traub

[57] ABSTRACT

A fuel reservoir comprises a tank having a base wall and side walls. In order to minimize the accumulation of water in the tank two pick-up pipes, are provided which are connected together to an outlet pipe. The first pick-up pipe extends to adjacent the base wall of the tank and the second pick-up pipe to some distance above the base wall. In use fuel and water will be drawn through the outlet pipe and in the event that the water in the tank freezes fuel can be drawn through the second pick-up pipe.

6 Claims, 1 Drawing Sheet

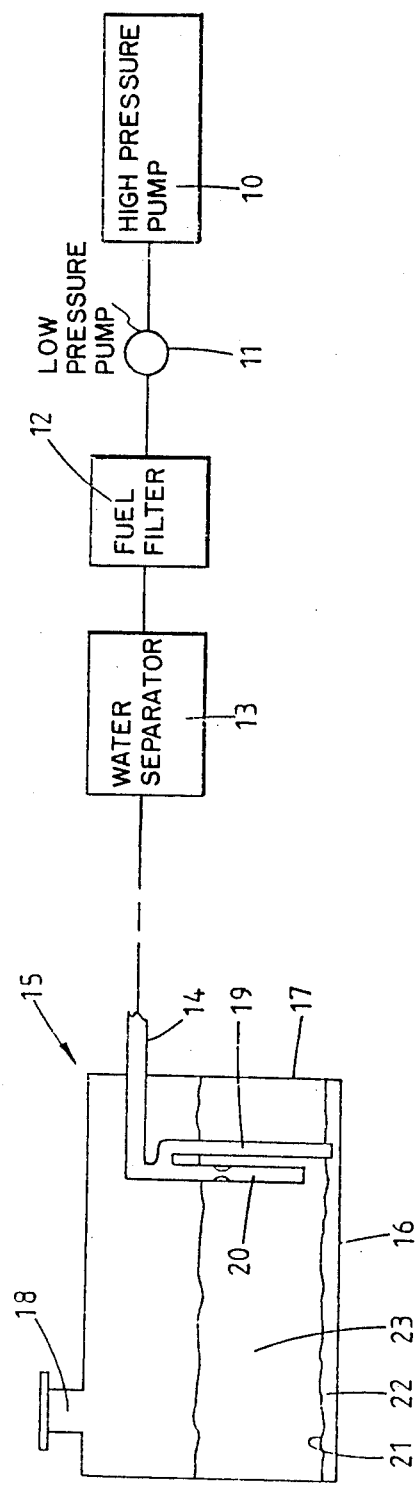

FUEL RESERVOIR

This invention relates to a fuel reservoir for liquid fuel more particularly but not exclusively to a fuel reservoir for a vehicle.

A fuel reservoir for a vehicle comprises a tank having a base wall and side walls, a fuel inlet to the tank and a fuel pick-up pipe extending through a wall of the tank for connection to a suction pump. It is the practice to ensure that the end of the fuel pick-up pipe within the tank is spaced a short distance above the base wall of the tank and one reason for this is to prevent water which collects in the tank over a period of use, freezing and blocking the pick-up pipe.

Water collects in the tank because firstly there is water mixed with the fuel which is supplied to the tank and secondly because as fuel is drawn out of the tank air is drawn into the tank. The air contains moisture which condenses in the tank. Modern tanks for reasons of economy are not usually provided with drain holes so that water collecting in the tank cannot be emptied readily from the tank. The water besides causing rusting of a steel tank also causes a further problem in that with some types of fuel it is possible for biological growths to occur at the interface between the water and the fuel and the growths can be drawn into the pick-up pipe thereby impairing or even preventing the flow of fuel in the vehicle fuel system as well as the blockage of gauze filters and the premature blocking of paper type fuel filters. It is therefore desirable to be able to remove the water collecting in the tank and the object of the present invention is to provide a fuel reservoir in a simple and convenient form.

According to the invention a fuel reservoir comprises a tank having a base wall and side walls, a first pick-up pipe extending within the tank to adjacent the base wall of the tank and a second pick-up pipe extending within the tank but being spaced from the base wall of the tank, said pipes being connected together whereby in use, fuel and water will flow from the tank.

An example of a fuel reservoir in accordance with the invention will now be described with reference to the accompanying drawing which is a diagrammatic illustration of the fuel system of a vehicle having a compression ignition engine.

Referring to the drawing the system includes a high pressure fuel pump 10 to which fuel is supplied by means of a low pressure pump 11. The inlet of the pump 11 is connected to a fuel filter 12 which may contain a paper element for retaining small particles of dirt entrained with the fuel. The inlet of the fuel filter is connected to a water separator 13 which includes a reservoir in which the water and fuel can separate by sedimentation. Provision is made for the water to be drained from the reservoir at suitable intervals and the separator may include electrical detection apparatus which provides an alarm when the level of water in the reservoir rises above a predetermined value.

The inlet of the separator is connected to a pipe 14 extending from a fuel tank generally indicated at 15. The tank has a base wall 16 and side walls 17 through one of which the pipe 14 extends. The upper wall of the tank is provided with a fuel inlet 18 which can be closed by a cap. The tank is vented to the atmosphere by means of a suitable vent not shown. The pipe 14 connects with a pair of pick-up pipes 19, 20. The first pick-up pipe 19 extends to adjacent the base wall of the tank whilst the pipe 20 terminates an appreciable distance from the base wall of the tank. In an example, the lower end of the pipe 19 lies approximately 2 mm from the base wall and the pipe 20 approximately 25 mm from the base wall.

The drawing illustrates an interface 21 between a water layer 22 and the fuel 23.

In use, when the engine is in operation, the pump 11 will draw fuel up the pipe 20 and a mixture of fuel and water up the pipe 19. The mixture will be passed to the separator 13 in which the water is separated so that substantially water free fuel is supplied to the filter. Thus as the vehicle operates the depth of the water layer will be reduced. If fuel is added to the tank and which contains a substantial amount of water, then the layer 22 will increase in depth. Nevertheless, the liquid drawn through the pipe 14 will be substantially fuel. In the event that the water freezes due to the vehicle being parked overnight, in freezing conditions, fuel will be drawn through the pipe 20 by the pump 11 in spite of the fact that the lower end of the pipe 19 is sealed by the frozen water.

Where the fuel reservoir is not fitted in a vehicle, as for example in the case of a static engine system or a heating system, the depth of the water layer will be reduced to the distance between the end of the pipe 19 and the base wall 16 of the tank. In the case of a vehicle this thin layer of water will due to the movement of the vehicle tend to be broken up and will become suspended in the water so that in the case of a vehicle, the tank may contain less water than is required to form a layer of the aforesaid depth.

For applications where the flow of fuel is very low the pick-up pipe 20 should be of smaller diameter than the pipe 19 or should incorporate a restrictor to ensure that fuel and water are drawn up the pipe 19. In applications where the flow of fuel is larger there is less need to restrict the flow of fuel through the pipe 20.

I claim:

1. A fuel reservoir for liquid fuel comprising a tank having a base wall and side walls, a first pick-up pipe extending within the tank to adjacent the base wall of the tank and a second pick-up pipe extending within the tank but being spaced from the base wall of the tank, said first pick-up pipe in permanent communication with said second pick-up pipe, said pipes being connected together to an outlet whereby in use when the outlet is connected to the inlet of a pump, and fuel and water in the tank will be drawn through the outlet and further including a single flow path restrictor in said second pick-up pipe.

2. A fuel system for an internal combustion engine comprising a pump operable to supply fuel to an associated engine, the pump having a fuel inlet and a fuel outlet, a fuel filter connected to the fuel inlet of the pump, a water separator through which fuel is supplied to the fuel filter, and a fuel reservoir comprising a tank having a base wall and side walls, a first pick-up pipe extending within the tank to adjacent the base wall of the tank and a second pick-up pipe extending within the tank but being spaced from the base wall of the tank, said pipes being connected together to a reservoir outlet, said reservoir outlet being connected to the water separator whereby when said pump is in operation fuel and water in the tank will be drawn through the reservoir outlet and the water will be retained in the water separator.

3. A fuel reservoir for liquid fuel comprising a tank having a base wall and side walls, a first pick up pipe extending within the tank to adjacent the base wall of the tank, a second pick-up pipe extending within the tank, said second pipe being spaced from the base wall of the tank, and an outlet, said first and second pipes being connected together within the tank and thereafter to said outlet, whereby in use, when the outlet is connected to the inlet of a pump, fuel and water in the tank will be drawn through the outlet.

4. A fuel reservoir for liquid fuel comprising a tank having a base wall and side walls, a first pick-up pipe extending within the tank to adjacent the base wall of the tank, a second pick-up pipe extending within the tank, said second pipe being spaced from the base wall of the tank, a restrictor means disposed in said second pick-up pipe, and an outlet, said first and second pipes being connected together within the tank and thereafter to said outlet, whereby in use, when said outlet is connected to the inlet of a pump, fuel and water in the tank will be drawn through the outlet.

5. A fuel system according to claim 2, wherein said first pick-up pipe and said second pick-up pipe are connected together within said tank.

6. A fuel system according to claim 2, further comprising restrictor means disposed in said second pick-up pipe.

* * * * *